(12) United States Patent
Wu et al.

(10) Patent No.: US 12,543,942 B2
(45) Date of Patent: Feb. 10, 2026

(54) MEDICAL APPARATUS FOR INSERTION INTO A BODY PASSAGE AND METHODS FOR USE

(71) Applicant: THE TRUSTEES OF COLUMBIA UNIVERSITY IN THE CITY OF NEW YORK, New York, NY (US)

(72) Inventors: Amy Wu, New Windsor, NY (US); Peter Yim, Englewood Cliffs, NJ (US); Miriam Saffern, Bergenfield, NJ (US); Xiaomeng Xian, Guangzhou (CN); Mary Grace Gana, Colts Neck, NJ (US); Samuel Castro, Lakewood, CA (US)

(73) Assignee: The Trustees of Columbia University in the City of New York, New York, NY (US)

( * ) Notice: Subject to any disclaimer, the term of this patent is extended or adjusted under 35 U.S.C. 154(b) by 801 days.

(21) Appl. No.: 17/848,173

(22) Filed: Jun. 23, 2022

(65) Prior Publication Data

US 2022/0338724 A1   Oct. 27, 2022

Related U.S. Application Data

(63) Continuation of application No. PCT/US2020/066885, filed on Dec. 23, 2020.
(Continued)

(51) Int. Cl.
*A61B 1/267* (2006.01)
*A61B 1/00* (2006.01)
*A61M 16/04* (2006.01)

(52) U.S. Cl.
CPC .......... *A61B 1/267* (2013.01); *A61B 1/00055* (2013.01); *A61M 16/0411* (2014.02); *A61B 2562/0247* (2013.01)

(58) Field of Classification Search
CPC ................... A61B 1/267; A61B 1/2673–2676
See application file for complete search history.

(56) References Cited

U.S. PATENT DOCUMENTS 5,070,859 A * 12/1991 Waldvogel ............ A61B 5/224
600/185
5,536,245 A   7/1996 Dahlbeck
(Continued)

FOREIGN PATENT DOCUMENTS

WO   WO-9615711 A1 *  5/1996  ......... A61B 1/00055
WO   WO-2017151796 A1 *  9/2017 ......... A61B 1/00066
(Continued)

OTHER PUBLICATIONS

Baek MS, et al. Video laryngoscopy versus direct laryngoscopy for first-attempt tracheal intubation in the general ward. Ann Intensive Care. Aug. 13, 2018;8(1)83.
(Continued)

*Primary Examiner* — Eduardo C Robert
*Assistant Examiner* — Michelle C Green
(74) *Attorney, Agent, or Firm* — BakerHostetler

(57) ABSTRACT

A medical apparatus for insertion into an internal passage of a subject is provided having a body portion defining an exterior surface; one or more sensors disposed on the exterior surface of the body portion, the one or more sensors providing an insertion force profile representing the force exerted by the internal passage on the sensors during insertion of the body portion; and a processor and non-volatile storage associated therewith, the processor configured to execute software to compare the insertion force profile provided by the sensors with two or more training force profiles stored on the storage, and classify the insertion force profile provided by the sensors as corresponding to at least one of the training force profiles.

33 Claims, 13 Drawing Sheets

Related U.S. Application Data

(60) Provisional application No. 62/969,370, filed on Feb. 3, 2020, provisional application No. 62/952,843, filed on Dec. 23, 2019.

(56) References Cited

U.S. PATENT DOCUMENTS

| | | | |
|---|---|---|---|
| 6,929,600 | B2 | 8/2005 | Hill |
| 7,153,260 | B1 | 12/2006 | Girgis |
| 7,946,981 | B1 | 5/2011 | Cubb |
| 2004/0122292 | A1 | 6/2004 | Dey et al. |
| 2005/0187434 | A1 | 8/2005 | Dey et al. |
| 2008/0300464 | A1* | 12/2008 | Dhingra ............... A61B 1/267 600/199 |
| 2010/0163023 | A1* | 7/2010 | Singh ............... A61M 16/044 73/1.01 |
| 2016/0058276 | A1* | 3/2016 | Ramos Da Silva ..... A61B 1/07 600/196 |
| 2017/0105614 | A1* | 4/2017 | Mcwilliam ........... A61B 1/267 |
| 2017/0215720 | A1* | 8/2017 | Walker ............... A61B 1/00042 |
| 2018/0221610 | A1* | 8/2018 | Larson ................. H04N 7/183 |
| 2018/0338675 | A1* | 11/2018 | Eggli ................... A61B 1/267 |

FOREIGN PATENT DOCUMENTS

| | | | |
|---|---|---|---|
| WO | 2019032400 | | 2/2019 |
| WO | WO-2019032400 A1 * | 2/2019 | ......... A61B 1/00032 |

OTHER PUBLICATIONS

Taboada M, et al. Comparison of Tracheal Intubation Conditions in Operating Room and Intensive Care Unit: A Prospective, Observational Study. Anesthesiology. Aug. 2018;129(2):321-328.

Almahmoud K et al. Trends in intubation rates and durations in ventilated severely injured trauma patients: an analysis from the TraumaRegister DGU®. Patient Saf Surg. Nov. 3, 2016;10:24.

Sakles JC, et al. The importance of first pass success when performing orotracheal intubation in the emergency department. Acad Emerg Med. Jan. 2013;20(1):71-78.

International Search Report cited in PCT/US2020/066885 dated Mar. 19, 2021, 2 Pages.

Written Opinion cited in PCT/US2020/066885 dated Mar. 19, 2021, 10 Pages.

* cited by examiner

T

E

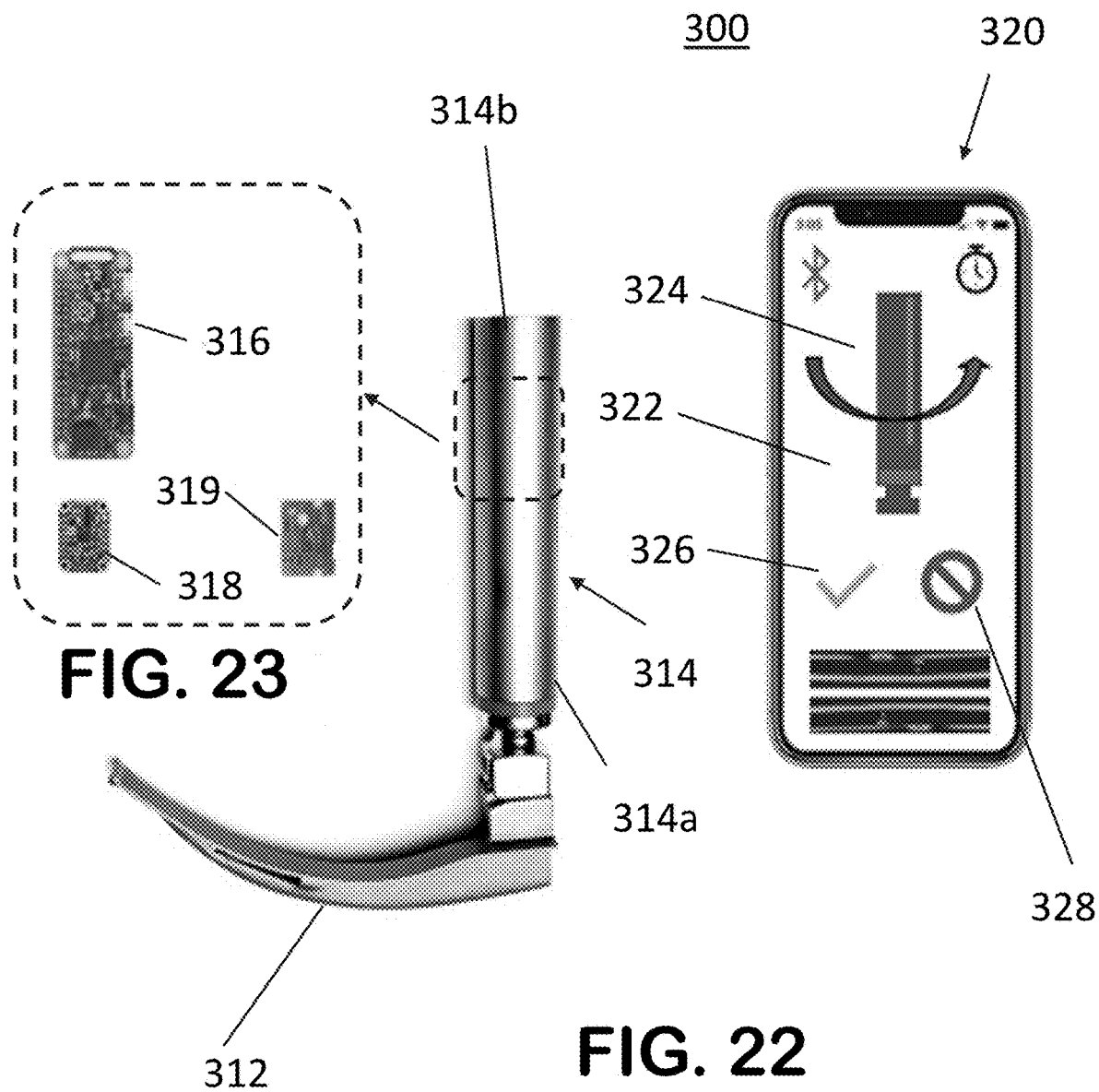

MEDICAL APPARATUS FOR INSERTION INTO A BODY PASSAGE AND METHODS FOR USE

CROSS-REFERENCE TO RELATED APPLICATIONS

This application is continuation of PCT/US2020/066885, entitled "A Medical Apparatus For Insertion Into a Body Passage and Methods For Use," filed Dec. 23, 2020, which claims priority to U.S. Provisional Application No. 62/952,843, filed Dec. 23, 2019, entitled "A Medical Apparatus For Insertion Into a Body Passage and Methods For Use," and U.S. Provisional Application No. 62/969,370, filed Feb. 3, 2020, entitled "A Medical Apparatus For Insertion Into a Body Passage and Methods For Use," all of which are incorporated by reference in their entirety herein.

FIELD

Medical apparatus and methods for insertion into an internal passage of a subject, and more particularly apparatus and technique using force sensors to assist placement.

BACKGROUND

Intubation is a common airway management technique that is indicated when a patient can no longer breathe independently, either in anticipation of a surgical procedure or during emergent medical situations (e.g. COVID19-associated respiratory failure). Intubation is a procedure that involves a laryngoscope and an endotracheal tube ("ETT"). The laryngoscope is used by the medical provider—called an intubator—to skillfully maneuver the tissues of the patient's oral cavity in order to visualize the trachea, where the ETT is to be inserted.

Though emergent intubation is a crucial, life-saving technique, it is difficult to master and maintain. Expert intubators, such as attending anesthesiology physicians, acquire their expertise through pattern recognition over years of medical training and daily intubation in their practice. However, novices such as non-anesthesia specialty physicians (ED, ICU), residents of all specialties that intubate, and EMS (EMT, paramedic, army medic), who lack extensive tactile experience and typically are called to intubate less frequently, struggle with the procedure. Consequently, intubations performed by such novices outside of the operating room, e.g., in the field, are associated with failure rates as high as 49% as compared to only 5 to 8% failure for trained anesthesiologists. Failure to intubate may result in hypoxia, hypotension, and even death. Vocal cord visualization is essential for endotracheal tube placement in the trachea and subsequent breathing restoration as the vocal cords mark the entrance into the trachea, where the endotracheal tube is to be placed.

Vocal cord visualization is facilitated by correct placement of a laryngoscope into an anatomical landmark called the vallecula, so that the epiglottis, the entrance to the trachea, can be lifted and the vocal cords visualized. Visualization and access is typically achieved by a use of a curved laryngoscopic blade, such as a Macintosh, or Mac, blade or a straight laryngoscopic blade, such as a Miller blade.

The Mac blade is designed to lift the epiglottis indirectly. The anatomical features can be challenging to navigate for non-expert intubators. For example, if the blade is lifted too early, when the blade is not placed far enough into the vallecula to engage the ligament, then pressure from the blade tip does not lift the epiglottis. Advancing a little farther, placing the tip in the vallecula, does lift the epiglottis. If the blade is advanced too far into the vallecula, it will press on the base of the vallecula and force the epiglottis down, obscuring the view of the glottis. The difference between lifting too early or too late (by placing the blade tip too shallow and too deep respectively) can be just a millimeter or two. While the Miller blade is favorable in elevating the tongue so that is removed from the field, there is a greater potential to damage the epiglottis with the straight blade.

Therefore, there is a need for a way to quickly and accurately guide the laryngoscope blade correctly into the vallecula in settings outside of the operating room.

SUMMARY

In one aspect, a medical apparatus for insertion into an internal passage of a subject is provided, including a body portion defining an exterior surface; one or more sensors disposed on the exterior surface of the body portion, the one or more sensors providing an insertion force profile representing the force exerted by the internal passage on the sensors during insertion of the body portion in the internal passage; and a processor and non-volatile storage associated therewith, the processor configured to execute software to compare the insertion force profile provided by the sensors with one or more training force profiles stored on the storage, and classify the insertion force profile provided by the sensors as corresponding to at least one of the training force profiles.

The medical apparatus may be inserted into the oral cavity of a subject. In some embodiments, the medical apparatus is a laryngoscope, a video laryngoscope, an endotracheal tube, a laryngeal mask airway (LMA), a combitube, a laryngeal tube, an endobronchial blocker, and the like.

In some embodiments, the medical apparatus, e.g., the laryngoscope, has a body portion that includes a blade portion defining an exterior surface thereof. In some embodiments, the one or more sensors are disposed on an exterior surface of the handle.

The medical apparatus, in its entirety, or one or more of its components, including the blade, the handle and the processor are disposable or reusable.

In some embodiments, the sensors are force sensing resistors. The sensors are one or more of flex sensors, strain gauges, gyroscopes, accelerometers, proximity sensors, light sensors, and temperature sensors and others to be determined as appropriate for insertion procedure.

In some embodiments, the processor is further configured to display the force profile. The force profiles can correspond to force exerted by the internal passage against the sensors as a function of time. For example, the training force profiles can include one or more of a force profile generated by insertion of the body portion in the vallecula, a force profile generated by insertion of the body portion in the trachea, and a force profile generated by insertion of the body portion in the esophagus, a force profile generated by insertion of the body portion too far into the vallecula, a force profile generated by insertion of the body portion not far enough into the vallecula, a force profile generated by insertion of the body portion so that the blade may come into traumatic contact with the patient's teeth, and a force profile generated otherwise by pulling up on the body portion in a clinically incorrect or correct location.

In another aspect, a medical apparatus for insertion into an internal passage of a subject is provided, including a body portion defining an exterior surface; one or more sensors disposed on the exterior surface of the body portion, the one or more sensors providing an insertion force profile representing the force exerted by the internal passage on the sensors during insertion of the body portion; and a processor and non-volatile storage associated therewith, the processor configured to execute software to compare the insertion force profile provided by the sensors with one or more training force profiles stored on the storage, the training force profiles corresponding to forces exerted on a sensor during insertion during a clinically correct insertion and a clinically incorrect insertion, and classify the insertion force profile provided by the sensors as a clinically correct insertion or a clinically incorrect insertion.

In some embodiments, the processor is further configured to execute software to display data between two sequential insertions of the body portion and to highlight the differences between pressure profiles.

An indicator can be included to convey to a user that the insertion profile corresponds to a clinically incorrect or clinically correct insertion profile. In some embodiments, the indicator is at least one of visual, audible or haptic.

In some embodiments, the force profiles correspond to force exerted by the internal passage against the sensors as a function of time. The clinically correct training force profile may include a force profile generated by insertion of the body portion in the vallecula, and the clinically incorrect force profile may include a force profile generated by insertion of the body portion in the trachea or the esophagus.

In another aspect, a method of insertion of a medical apparatus into an internal passage of a subject is provided, including providing a body portion defining an exterior surface and one or more sensors disposed on the exterior surface of the body portion; inserting the body portion into the internal passage of the subject; providing an insertion force profile by the one or more sensors, the force profile representing the force exerted by the internal passage on the sensors during insertion of the body portion; and providing a processor and non-volatile storage associated therewith, the processor configured to execute software comparing the insertion force profile provided by the sensors with one or more training force profiles stored on the storage, and classify the insertion force profile provided by the sensors as corresponding to at least one of the training force profiles; and classifying the insertion force profile provided by the sensors as corresponding to at least one of the training force profiles.

In some embodiments, the one or more training force profiles correspond to forces exerted on a sensor during insertion during a clinically correct insertion and a clinically incorrect insertion, and classifying the insertion force profile comprises classifying the insertion force profile provided by the sensors as a clinically correct insertion or a clinically incorrect insertion In some embodiments, the method includes providing notification to a user that the insertion force profile corresponds to a correct insertion or an incorrect insertion.

In another aspect, a medical apparatus for insertion into an internal passage of a subject provides guidance to a user regarding proper placement during insertion. The medical apparatus includes a body portion defining an exterior surface; one or more sensors disposed on the exterior surface of the body portion, the one or more sensors providing an insertion data profile representing one or more parameters detected by the sensors during insertion of the body portion; and a processor and non-volatile storage associated therewith, the processor configured to execute software to compare, during insertion, the insertion data profile provided by the sensors with one or more training data profiles stored on the storage, the training force profiles corresponding to data received by a sensor during insertion during a clinically correct insertion and a clinically incorrect insertion, and classify, during insertion, the insertion data profile provided by the sensors as a clinically correct insertion or a clinically incorrect insertion.

In some embodiments, the sensors are force sensors and the insertion data profile and the training data profiles are insertion force profiles and training force profiles, respectively, which represent the force exerted in the body portion during insertion when plotted versus time or depth of insertion.

In another aspect, a method for insertion into an internal passage of a subject provides guidance to a user regarding proper placement during insertion. The method includes providing a body portion defining an exterior surface and one or more sensors disposed on the exterior surface of the body portion; inserting the body portion into the internal passage of the subject; providing an insertion force profile by the one or more sensors, the force profile representing the force exerted by the internal passage on the sensors during insertion of the body portion; and providing a processor and non-volatile storage associated therewith, the processor configured to execute software comparing the insertion force profile provided by the sensors during insertion with one or more training force profiles stored on the storage, and classify the insertion force profile provided by the sensors as corresponding to at least one of the training force profiles; and classifying, during insertion, the insertion force profile provided by the sensors as corresponding to at least one of the training force profiles.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

A medical apparatus is disclosed herein for insertion into an internal passage of a subject. For example, an exemplary medical apparatus is designed for insertion into the oral cavity. The medical apparatus can be, without limitation, laryngoscope, for insertion into a subject's airway with intended placement in the vallecula. In other embodiments, the medical apparatus is a laryngeal mask airway (LMA), an endotracheal tube, a combitube, a video laryngoscope, an endobronchial blocker, and the like.

FIG. 22 illustrates a medical apparatus for insertion in a body conduit in accordance with a further exemplary embodiment of the disclosed subject matter.

FIG. 23 is schematic view illustrating components of the apparatus of FIG. 22, illustrated in enlarged form.

DETAILED DESCRIPTION

Figure 1:
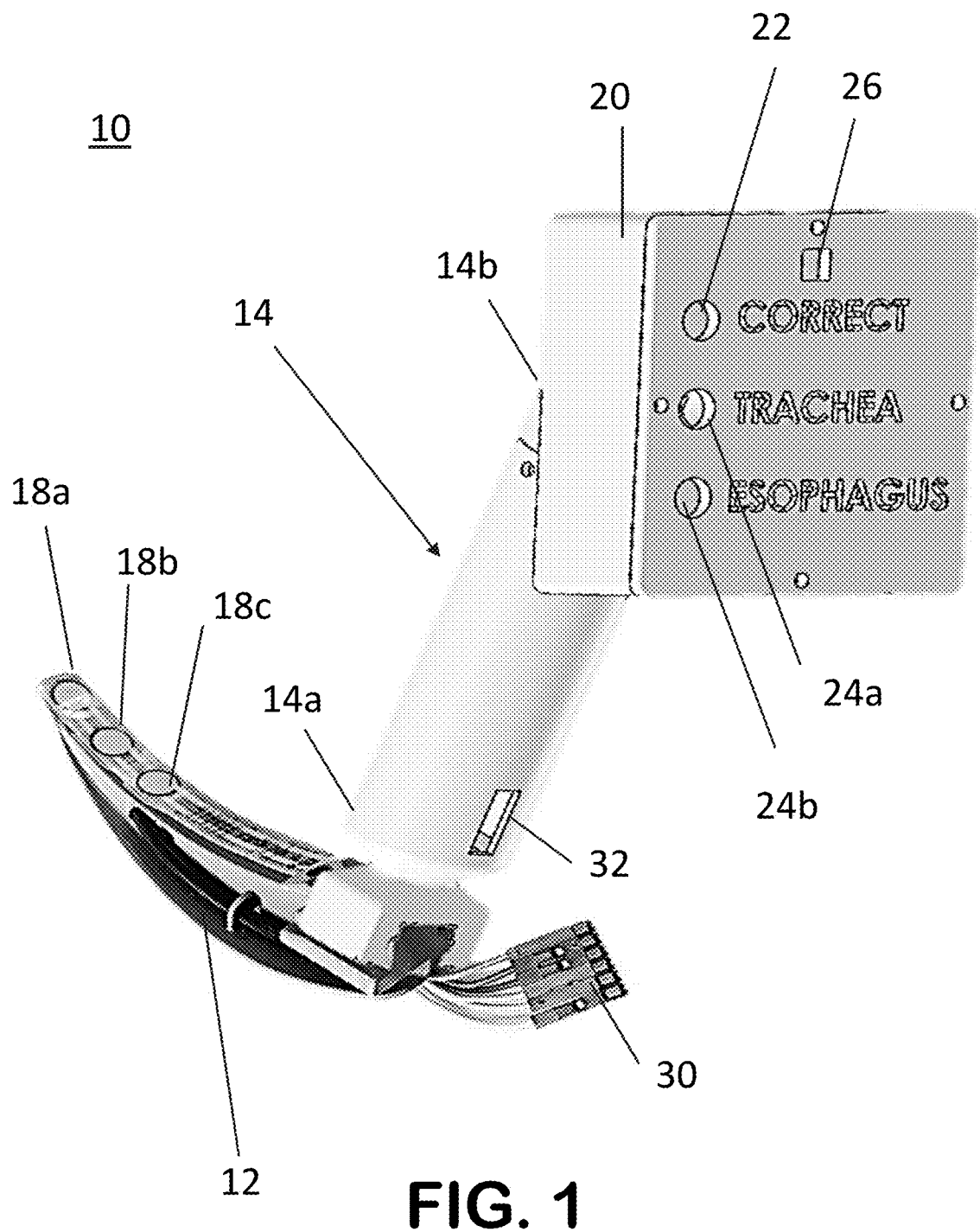
FIG. 1 illustrates a medical apparatus for insertion in a body conduit in accordance with an exemplary embodiment of the disclosed subject matter.

A medical apparatus is disclosed herein for insertion into an internal passage of a subject by a user. For example, an exemplary medical apparatus is designed for insertion into the oral cavity. The medical apparatus can be, without limitation, a laryngoscope for insertion into a subject's airway with intended placement in the vallecula. In other embodiments, the medical apparatus is a laryngeal mask airway (LMA), an endotracheal tube, a combitube, a video laryngoscope, an endobronchial blocker, and the like.

In an exemplary application of the medical apparatus, routine endotracheal intubation is the placement of an endotracheal tube (ETT) through the vocal cords into the trachea to ventilate the lungs of a subject with normal anatomy. Since the vocal cords are the anatomical landmark of the trachea, vocal cord visualization is necessary for successful intubation. Visualization is achieved through use of a curved Macintosh laryngoscope blade that is inserted into the vallecula, the cavity formed by the epiglottis and the base on tongue, and then pulled at 45° to lift the epiglottis and reveal the trachea, which is marked by the vocal cords. According to multiple studies, intubations that occur outside of the operating theater by less trained (non-anesthesiologist) intubators—such as ER or ICU doctors, EMTs or army medics—have a very high failure rate on first attempt. Upon consulting experts, two main failure modes were determined based on the curved Macintosh laryngoscope blade. One failure mode is if the laryngoscope blade is placed in the trachea, which increases the likelihood of placing the ETT into the esophagus, resulting in the ventilation of the stomach as opposed to the lungs. The second failure mode is when the blade tip is placed in the esophagus; this ensures that the ETT tube is placed incorrectly into the esophagus. It is understood that the failure modes described herein are exemplary, and other failure modes may be detected by the medical apparatus using the principles described herein.

Failure to intubate successfully may result in hypoxia, which results in brain death and cardiac arrest if prolonged, as well as hypotension. Other complications may include damage to teeth, aspiration, esophageal hemorrhaging, and nerve injury. The rate of adverse events increases with each subsequent intubation attempt. The incidence of adverse events upon first attempt intubation is 14.2%, but increases upon subsequent attempts; second attempt increases adverse events to 47.2%, 63.6% after three attempts, and 70.6% after four or more attempts. Sakles J C, Chiu S, Mosier J, Walker C, Stolz U, "The importance of first pass success when performing orotracheal intubation in the emergency department," *Acad Emerg Med.* 2013; 20(1):71-78. The more intubation attempts required, the more time elapses, during which oxygen saturation levels can fall critically low, resulting in hypoxaemia, hypotension, cardiac arrest, and death. If intubation attempts repeatedly fail, the situation is considered "cannot intubate, cannot ventilate" (CICV), and the healthcare provider resorts to an emergency cricothyrotomy, a last resort technique that frequently proves fatal.

Current methods include video laryngoscopy to facilitate endotracheal tube intubation. It allows the user to visualize the real time laryngoscope blade tip location on a video screen. However, experts assert that less experienced intubators still have trouble placing the blade correctly for vocal cord visualization because they cannot identify anatomical landmarks among the seemingly similar masses of pink tissue visible on the screen. A large study determined that video laryngoscopy does not improve first pass success rate and increases chance of life threatening complication. Lascarrou et al., "Video Laryngoscopy vs. Direct Laryngoscopy on Successful First-Pass Orotracheal Intubation among ICU Patients," JAMA 2017; 317(5): 483-493.

Intubation can be described as a "highly perishable kinesthetic skill." As such, the medical apparatus introduces a touch-based solution. In some embodiments, force sensors are adhered to the upper face of a laryngoscope blade. These sensors record the force pattern used during an intubation attempt and use this pattern to determine the blade location and provide feedback to the user. The medical apparatus simulates expertise for novice intubators by comparing novice data obtained in real time to stored data collected from expert intubators (anesthesiologists at New York Presbyterian Hospital). Thus, the medical apparatus allows the novice intubator to adjust the blade positioning as needed in order to correctly intubate. The medical apparatus is a novel system that allows for haptically-guided intubation based off of expert intubation technique.

The use of force sensors in medical teaching devices has recently been of interest for medical education. Many complex medical techniques are difficult to convey verbally and visually. Many techniques are haptically unique, and ideally would be taught in that manner, but current medical education methods do not fulfill this need. The use of a force sensor equipped mannequin leaves unaddressed the hazards of inexperienced intubators required to intubate in out-of-the-operating room settings. The disclosed medical apparatus, in attaching force sensors to the laryngoscope blade and/or handle itself and providing a means of processing novice data in comparison to expert data, is an innovative way of both addressing subject safety concerns for out-of-the-operating intubation as well as provide a new way of medical education.

A medical apparatus 10 in accordance with an exemplary embodiment of the disclosed subject matter is illustrated in FIG. 1. Medical apparatus 10 is a laryngoscope having a laryngoscope blade 12, a handle 14 and a monitor 20.

In some embodiments, the blade 12 for insertion into the body passage can be a Mac blade. A Miller blade can be employed in other embodiments. The blade 12 can include a flashlight. One or more sensors, e.g., tip sensor 18a, middle sensor 18b, and back sensor 18c, are disposed on the outer surface of the blade 12. In the exemplary embodiments, sensors are force sensing resistors (FSR). FSRs are considered piezoresistive sensors, which are a class of flexible strain gauges that increase in resistance as pressure is applied. Thus, when the sensors are touched, i.e., when they sense contact force, the FSR assumes a corresponding resistance, which is associated with a corresponding voltage for a particular current (Ohm's Law). In some embodiments, the sensors are disposed on the handle 14. In some embodiments, the sensors are disposed on both the blade 12 and the handle 14. Medical grade insulation with stability at body temperature and in contact with oral fluids is used. This was met in one embodiment by applying a layer of verified medical tape for biocompatibility. In some embodiments, the blade 12 is reusable, and is made sanitary with the use of sanitary slip covers, such as those used the C-MAC from Karl Storz.

During insertion, the user grasps the handle 14. The blade 12 is secured to the distal end 14a of the handle 14. In some embodiments, the blade is removable from the handle 14 and may be disposable. The monitor 20 is secured to the proximal end 14b of the handle 14. A processor, such as a Raspberry Pi Zero processor, is housed within the monitor. One of more batteries, such as rechargeable batteries, are stored within the handle 14 and provide power for the processor. As shown in FIG. 1, the sensors 18a, 18b and 18c are electrically connected to a plug 30, which is in turn removably received in a socket 32 on the handle 14 to facilitate removal and/or replacement of the blade 12. Further electrical connection is provided within the handle 14 to electrically connect the sensors to the processor. The processor collects and processes data from the sensors 18a, 18b and 18c, and provides feedback signals to the user as will be described in greater detail herein. In some embodiments, the feedback signal are visual, audible or haptic. For example, monitor 20 provides visual signals including an LED light 22 that indicates correct insertion of the blade 12, and one or more LED lights 24a, 24b, that indicate incorrect insertion, e.g., LED 24a indicates insertion in the trachea and LED 24b indicates insertion in the esophagus. (As used herein, "normal" or "correct" insertion refers to placement of the blade 12 into the vallecula. The use of "incorrect" insertion refers to placement that fails to enter the vallecular, and typically refer to tracheal or esophageal placement of the blade.) Monitor 20 further includes a switch 26 that is activated by the user to begin data collection from the sensors. Voltages are continuously collected when the medical apparatus is turned on. In some embodiments, the processor and LED lights 22, 24a and 24b are provided on the handle 14. In some embodiments, the LED lights 22, 24a and 24b are replaced with a display unit, such as an OLED display which is configured to display the force profile as illustrated in FIGS. 10-12, 14-16 and 18-20. In some embodiments, the feedback signals are provided audibly with a speaker unit in the monitor 20 or handle 14. In some embodiments, a haptic feedback is provided by a vibrator component or actuator, such as a vibration motor or linear resonant actuator provided in the handle 14 or monitor 20.

The sensors 18a, 18b, and 18c provide an output signal as the medical apparatus is inserted into the body passage. The output signals provide a data profile plotted against time. In an exemplary embodiment, the sensors are FSR that are used to generate a force profile. For example, FSRs can output force data as voltage. The voltage can be correlated back to a particular force if needed.

Figure 2:
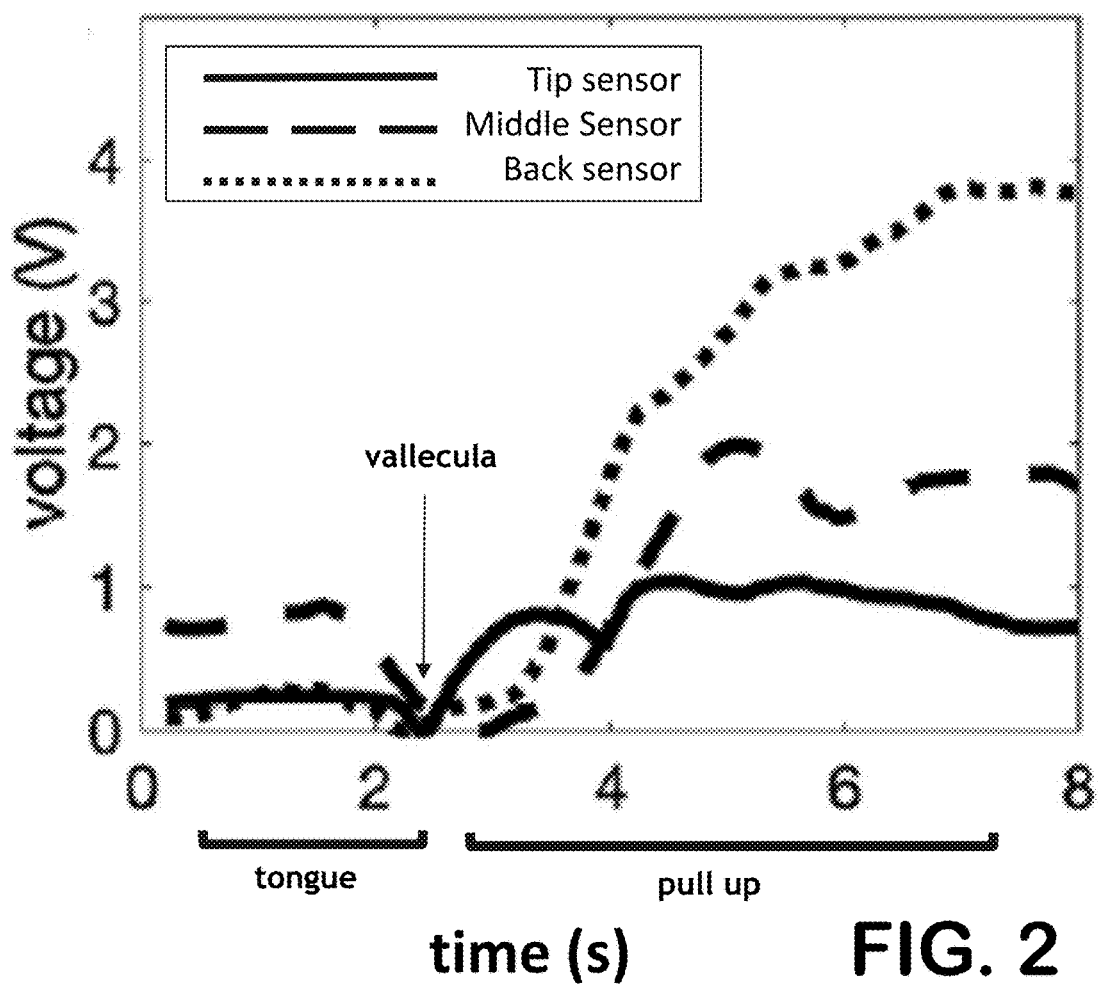
FIG. 2 is a time plot illustrating the forces generated by the anatomical features within the body conduit during insertion of the medical apparatus of FIG. 1.
Figure 3:
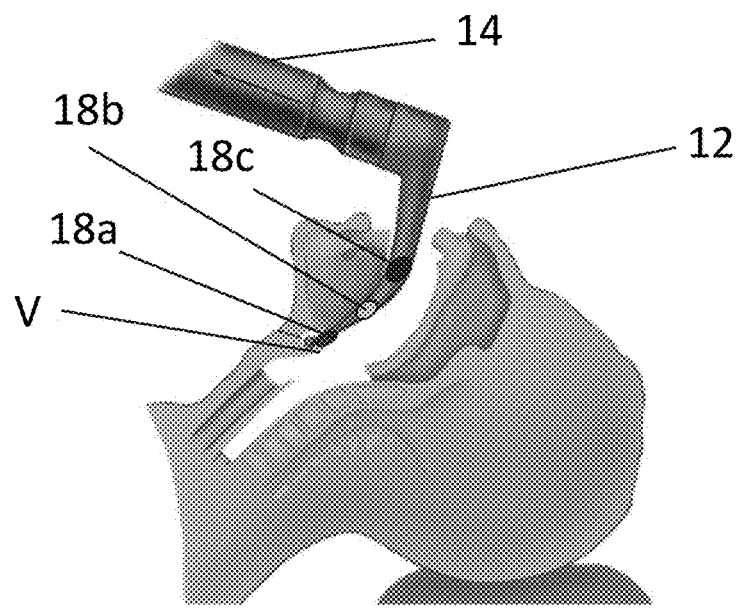
FIG. 3 illustrates the medical apparatus inserted in the body conduit of a subject, showing the subject in cross-section, the procedure associated with the time plot illustrated in FIG. 2.
Figure 4:
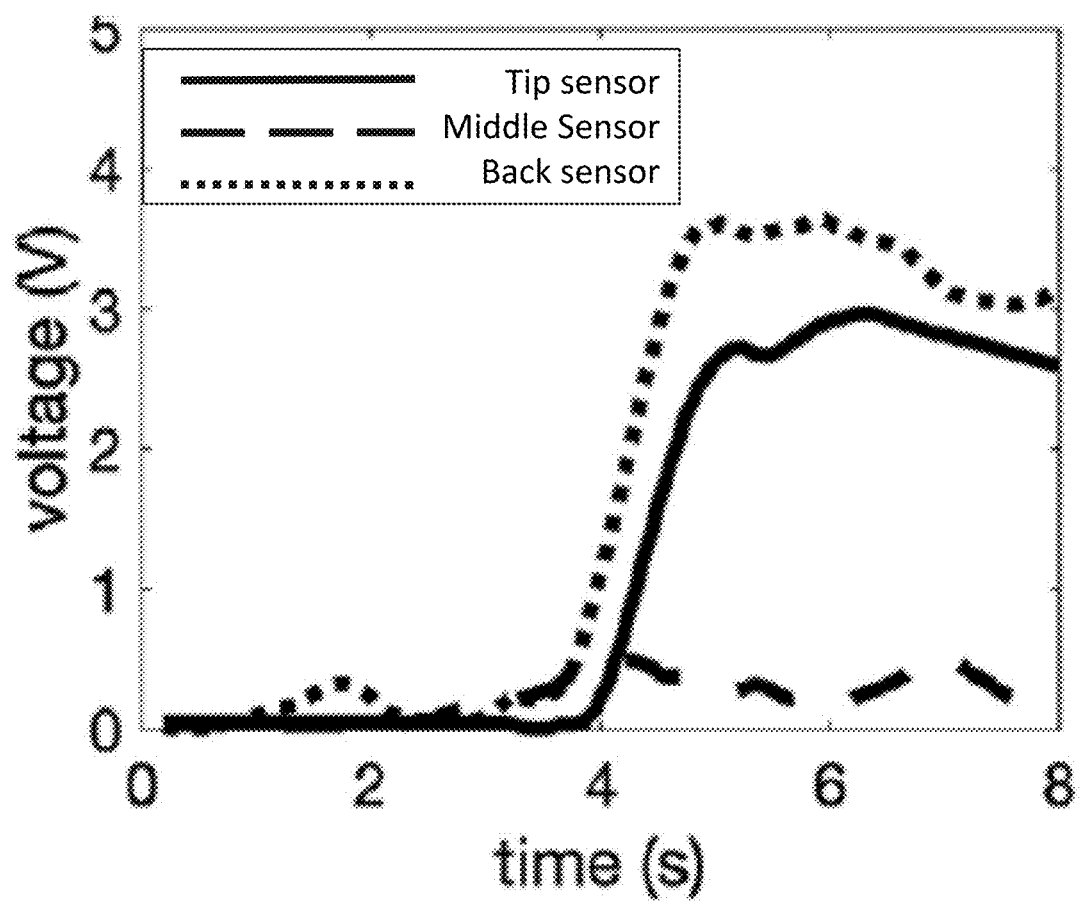
FIG. 4 is a time plot illustrating the forces generated by the anatomical features within the body conduit during insertion of the medical apparatus of FIG. 1.
Figure 5:
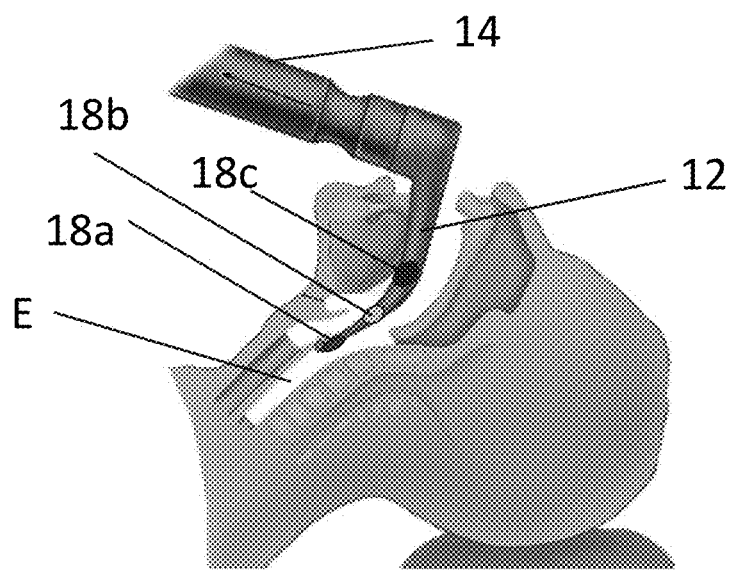
FIG. 5 illustrates the medical apparatus inserted in the body conduit of a subject, showing the subject in cross-section, the procedure associated with the time plot illustrated in FIG. 4.
Figure 6:
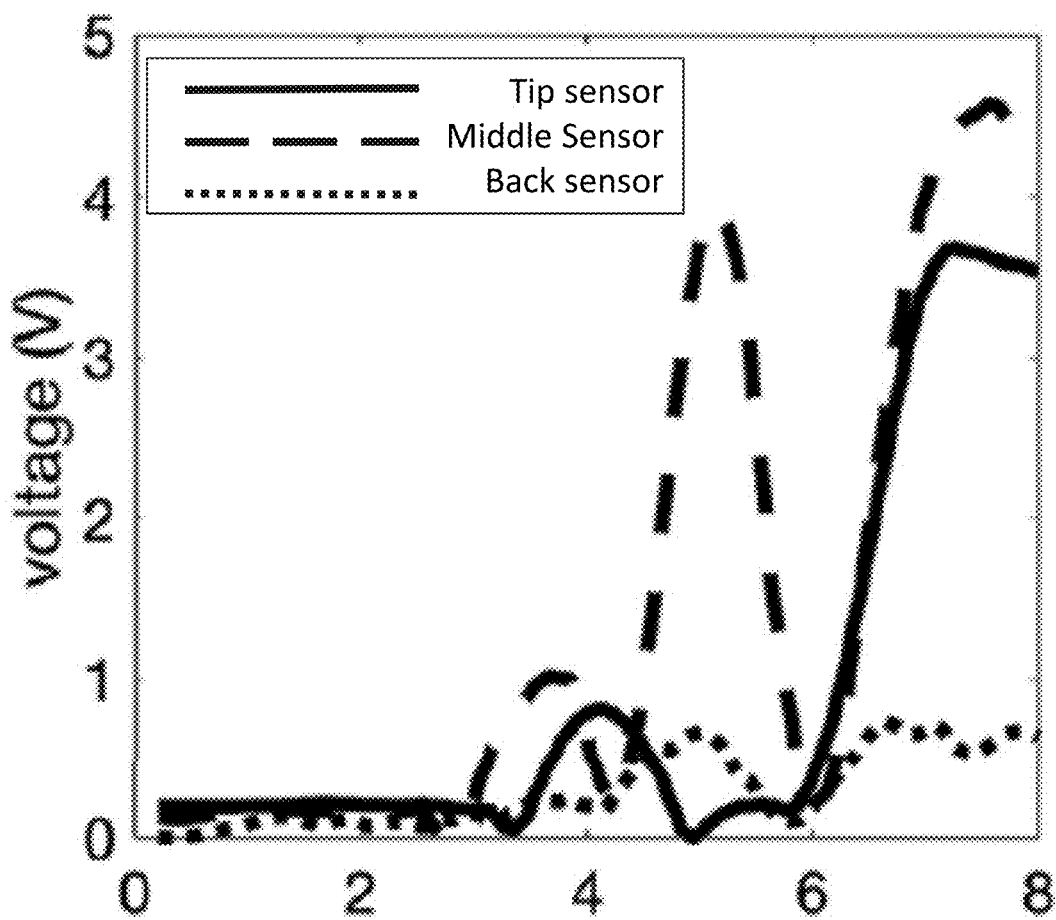
FIG. 6 is a time plot illustrating the forces generated by the anatomical features within the body conduit during insertion of the medical apparatus of FIG. 1.
Figure 7:
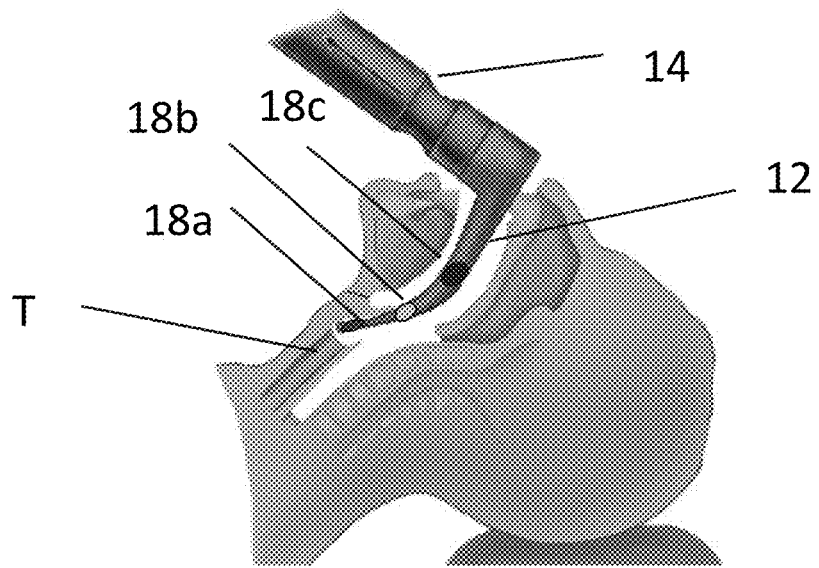
FIG. 7 illustrates the medical apparatus inserted in the body conduit of a subject, showing the subject in cross-section, the procedure associated with the time plot illustrated in FIG. 6.

The processor in the medical apparatus 10 identifies specific features of the resulting voltage profiles and uses a pre-trained algorithm to provide the user with real-time feedback on whether the medical apparatus has been correctly placed. As illustrated in FIG. 3, the blade 12 is correctly inserted into the vallecula V, and the resulting force profile generally includes a number of distinctive features. For example, as shown in FIG. 2, the force profile of tip sensor 18a (solid line) remains low during insertion. When the blade 12 is incorrectly inserted into the esophagus E (FIG. 5), the force profile of the mid sensor 18b (dashed line) remains low during insertion (FIG. 4). When the blade 12 is incorrectly inserted into the trachea T (FIG. 7), the force profile of the back sensor 18c (dotted line) remains low during insertion (FIG. 6). Expert training profiles of correct insertion in the vallecula and incorrect insertion at the trachea and/or the esophagus are stored in a memory unit associated with the processor. The processor compares the voltage profile at insertion with expert training profiles and alerts the user whether the blade of the medical apparatus has been correctly placed in the vallecula, or incorrectly in the trachea or esophagus.

Initial testing of the medical apparatus 10 shows that it is able to detect correct intubation with 95% sensitivity and 91% specificity [n=60], outperforming the objected 93% sensitivity and 83% specificity. When novice intubators used the medical apparatus 10, the time it took for them to successfully intubate was significantly decreased (9.65±3.82 seconds (aided) to 23.25±10.81 seconds (unaided)). Furthermore, the average number of attempts to successfully intubate was significantly close to the first attempt success goal (95% first pass success when aided, 55% when unaided). Thus, the medical apparatus effectively simulates intubation expertise in non-experts.

Design Considerations

Time Constraints. Under current standards, a novice intubator must be able to insert the tube (or reventilate) in 30-60 seconds. Since this time limit includes tube insertion, consultation with expert intubator suggested that blade placement feedback needs to be useful in 4-8 seconds, consistent with the time taken for our expert intubators to place the laryngoscope blade. See, e.g., Table. 1.

TABLE 1

|  | Aided novice intubation (n = 20) | Unaided Direct novice intubation (n = 20) |
| --- | --- | --- |
| Intubation time (s) p < 0.001 | 9.65 ± 3.82 | 23.25 ± 10.81 |
| First pass success rate | 95% | 55% |

Under current standards, the medical apparatus cannot add to dimensions of the standardized Mac blade to minimize disturbances to standard intubation technique and tube insertion. In one embodiment, the force sensing resistors (FSR) and wire were integrated within the blade so that the dimensions of the blade are essentially the same. The blade 12 is within 130 mm, the dimension of Mac 3 laryngoscope blade.

The expert profile data stored on the medical apparatus is derived from force profile data taken over the duration of individual intubation attempts from multiple anesthesiologists from New York Presbyterian Hospital considered expert intubators. From this expert force profile data set, 40+ potentially significant force profile features were calculated, a machine learning classification application was used to determine which of these features were the most important to effectively distinguishing correct (placement into the vallecula) and incorrect (placement into the trachea or the esophagus) laryngoscope blade tip placement. A k-nearest-neighbor algorithm was used to compare the most significant features of real-time novice intubator force data collected to the entire to a labeled expert data set of correct and incorrect placement features. This algorithm is implemented using a Raspberry Pi Zero computer housed within the laryngoscope blade handle "head". From this comparison, the device determines whether the laryngoscope blade is likely place correctly in the vallecula, incorrectly in the trachea, or incorrectly in the esophagus. This prediction is output to the user via the turning on of one of the three-labeled LED lights on the "head" of the blade.

Eight most significant characteristic features of each trial were calculated, and the feature sets labeled as correct, tracheal, or esophageal for each trial. It is understood that error methods are upon continuation of research and development. Stored on the memory associated with Pi computer is a table that contains the eight characteristic features of 140 expert intubator voltage profiles labeled as clinically correct, clinically incorrect (tracheal), or clinically incorrect (esophageal). The eight features used were as follows: 1-3) total RMS for each of the three sensors, 4) maximum slope of the middle sensor, which was determined by computing the slope of a linear fit for each successive set of a specified number of data points until the end of the data collection, 5) minimum slope of the middle sensor, 6) an output of which sensor had the lowest total RMS, 7) which sensor had the highest total RMS, and 8) which sensor had the lowest minimum slope. When the device is used in real time, every three seconds the eight characteristic features of the voltage profiles are analyzed by a program on the Pi. A k-nearest neighbors algorithm with six neighbors then predicts the blade location (correctly placed in the vallecula, incorrectly placed in the trachea, or incorrectly placed in the esophagus), by comparing these calculated features to the features of the expert data in the table. It is understood that other time periods may be used, such as 2 seconds, 3 seconds, 4 seconds, 5 seconds, 10 seconds, etc. Moreover, it is contemplated that the algorithm may analyze a set of 8 characteristic features, or a smaller or larger set of characteristic features.

Effectively, the medical apparatus is able to inform the novice intubator whether the forces they felt during the attempt is comparable to the haptic forces felt by an expert intubator, such as an anesthesiologist. Furthermore, features of exact failure modes can also be determined by the medical apparatus, thus allowing for informative feedback to be provided to the intubator.

Hardware: The first embodiment of the medical apparatus includes a standard, size 3 Macintosh laryngoscope blade (attached to a 3D-printed custom handle). Three force sensing resistors are attached to the top face of the blade, and the force it detects when the blade comes in contact with tissue in the oral cavity is translated into voltages via a peripheral circuit and processed by a portable microcomputer. A classification algorithm, pre-trained with expert data, as described below, then predicts the blade location. This prediction provides feedback to the user via LED lights. In some embodiments, the medical apparatus include a transmitter/emitter (not shown) to provide real-time force profile data to a receiver via Bluetooth, Wi-Fi or NFC protocols. In some embodiments, the receiver is an anesthesia machine, a custom monitor with a microcomputer, or a smartphone.

Figure 8:
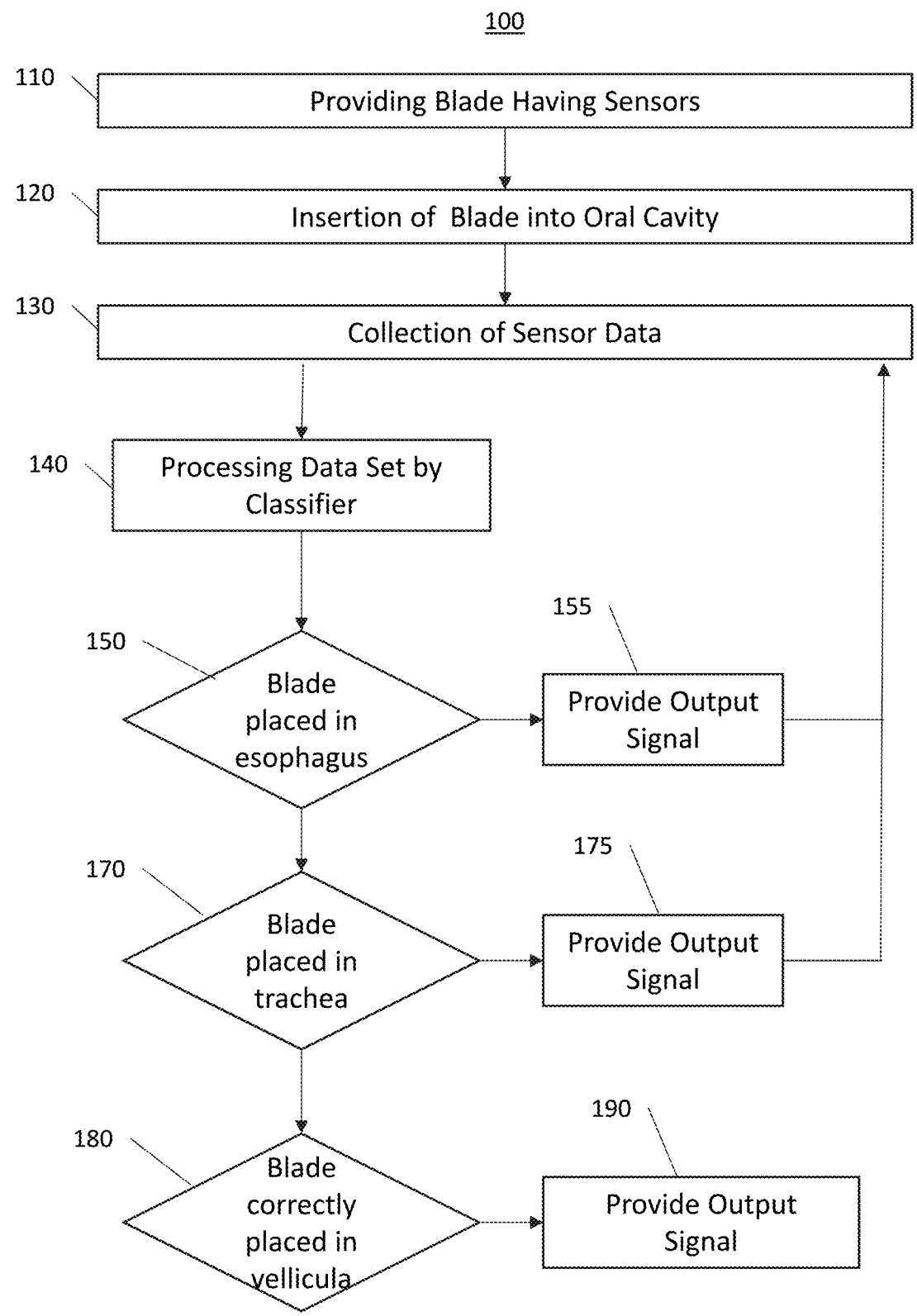
FIG. 8 is a process flow chart illustrating exemplary methods of use of the medical apparatus of FIG. 1.

Software: The classification algorithm programmed on the portable microcomputer was pre-trained with data from expert intubators performing correct intubation and simulating incorrect intubation. FIG. 8 is schematic of the process flow 100 of the medical apparatus 10. A blade defining an exterior surface and having one or more sensors disposed on the exterior surface of the blade is provided at step 110. The blade is inserted into the oral cavity of the subject at step 120. The sensor data from the sensors is collected at step 130. The collections of data includes providing an insertion force profile by the one or more sensors. The force profile represents the force exerted by the internal passage on the sensors during insertion of the body portion.

The processing of three seconds of sensor data is provided at step 140. A processor and non-volatile storage associated therewith are provided. The processor is configured to execute software comparing the insertion force profile provided by the sensors with the training force profiles stored on the storage, and to classify the insertion force profile provided by the sensors as corresponding to at least one of the training force profile. The insertion force profile provided by sensors is classified as corresponding to at least one of the training force profiles. If the blade is determined as being clinically incorrect, i.e., placed in the esophagus (step 150), an output signal is provided (Step 155). In medical apparatus 10 output signal includes illumination of LED 24a. Upon illumination of the LED 24a, the user is instructed to adjust blade placement. If the blade is determined as being clinically incorrect, i.e., placed in the trachea (step 170), an output signal is provided (Step 175). In medical apparatus 10 output signal includes illumination of LED 24b. Upon illumination of the LED 24b, the user is instructed to adjust blade placement. If the blade is determined as being correctly placed in the vallecula (step 180), an output signal is provided (Step 190).

The ability of the apparatus to accurately and precisely predict the laryngoscope blade location with a sensitivity greater than 93% (based on a meta-analysis of capnography, the method commonly used to verify correct tube placement) and specificity greater than 83% (the first-attempt success rate determined from a meta-analysis of experienced intubators using the GlideScope video laryngoscope in the general ward) was assessed. To do this, the system was coupled to a video laryngoscope blade; the force sensing resistors were attached to the top face of the blade, which was attached to our peripheral circuit, data processor, and feedback system. In this way, the path that the blade was taking was visualized to determine whether the blade was placed correctly in the vallecula or incorrectly in the trachea or esophagus so that it could be compared to the blade location calculated by the classifier. Twenty trials of each type of intubation—correct, tracheal, and esophageal—were simulated on a Laerdal Airway trainer in order to determine how well the optimized algorithm performed. The medical apparatus was able to predict the location of the blade with a sensitivity of 95% and a specificity of 91%, which outperformed our objective sensitivity and specificity.

Figure 9:
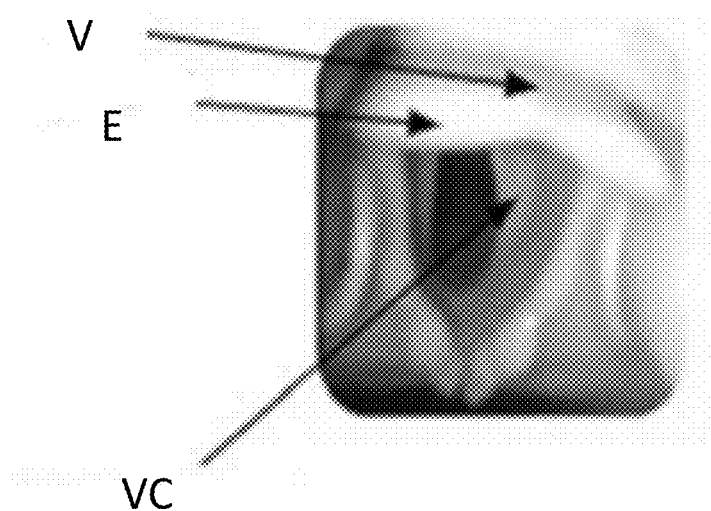
FIG. 9 is an image of the anatomical features of the body conduit as taken by a camera mounted on the medical apparatus.
Figure 10:
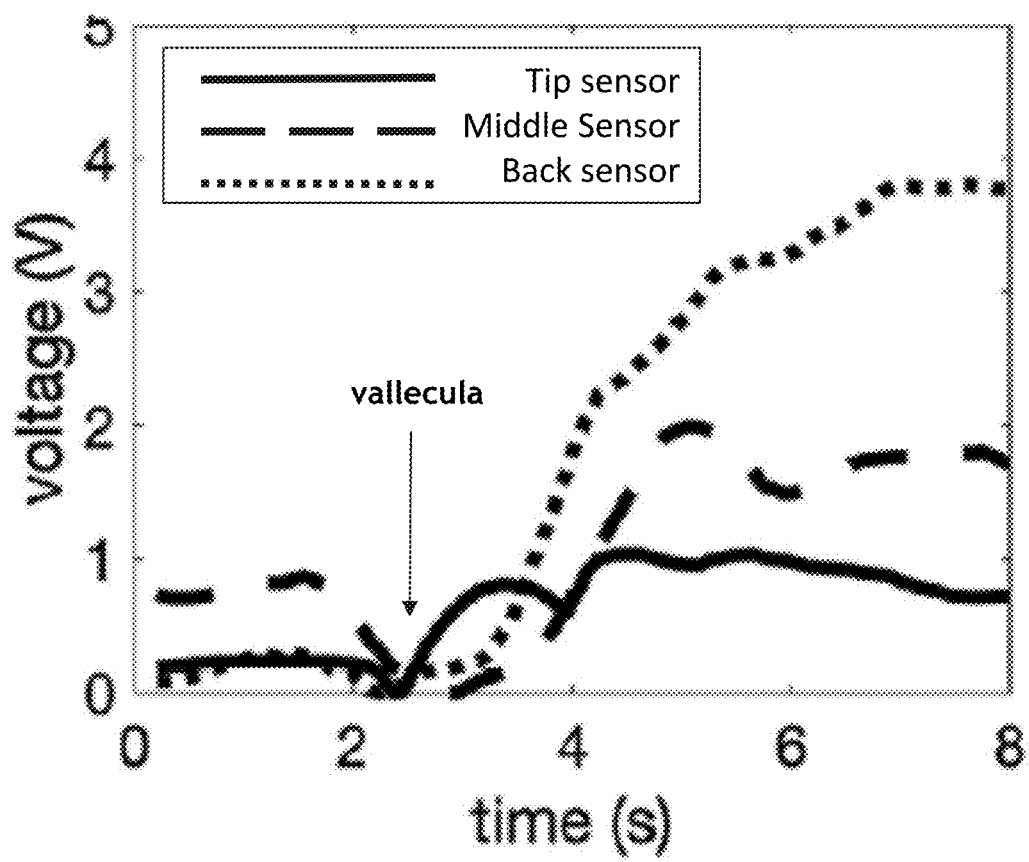
FIGS. 10-12 are time plots illustrating the forces generated by the anatomical features within the body conduit during insertion of the medical apparatus of FIG. 1
Figure 11:
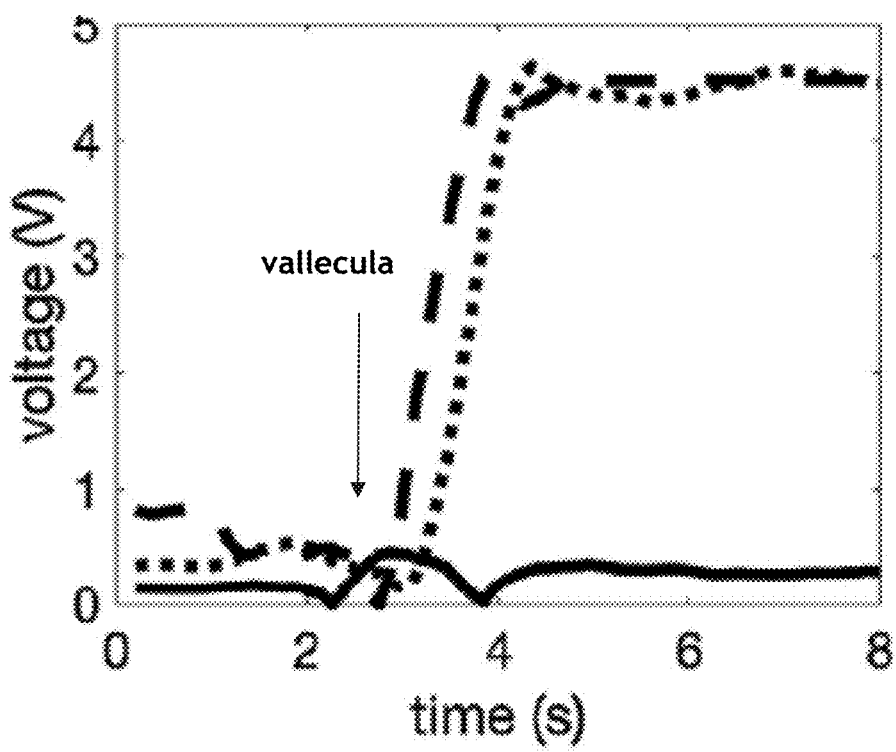
Figure 12:
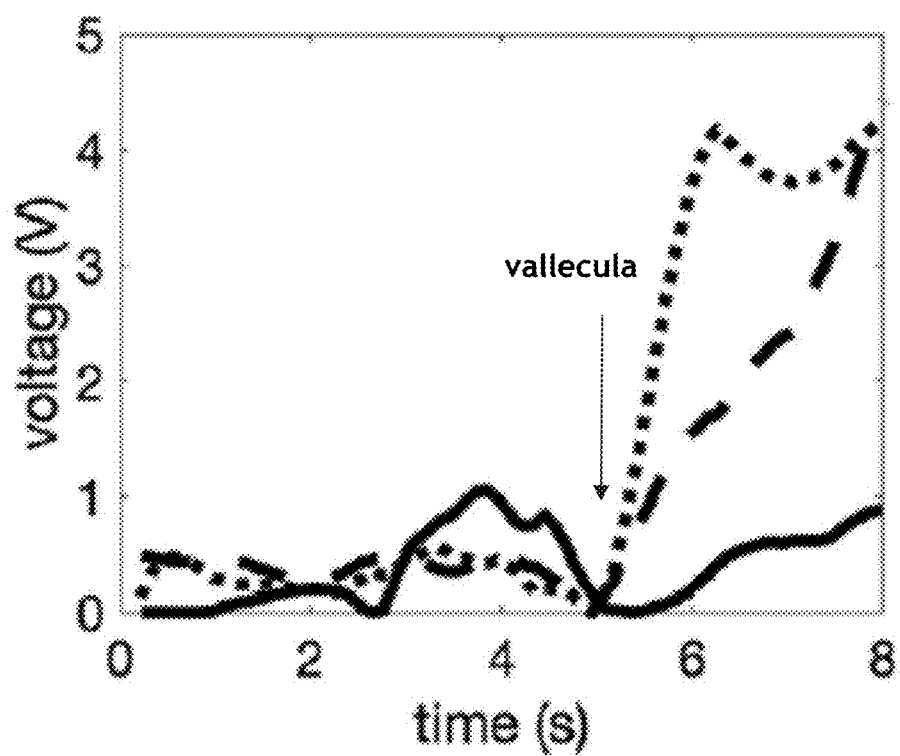

FIG. 9 is an image from a video laryngoscope indicating the locations of the vallecula V, the epiglottis E and the vocal cords VC as seen from a camera located on the blade. FIGS. 10-12 illustrate representative voltage profiles from three trials, illustrating the voltage readings of the three sensors—tip sensor 18a (solid line), middle sensor 18b (dashed line) and back sensor 18c (dotted)—located on the blade 12, from which the features were calculated and used to train the algorithm. When the video laryngoscope screen showed that the blade was in the correct position (blade is in the vallecula V, epiglottis E is lifted, and vocal cords VC are clearly visualized), the algorithm correctly predicted that the blade was in the correct location. The output signal for correct placement, LED 22, was illuminated.

Figure 13:
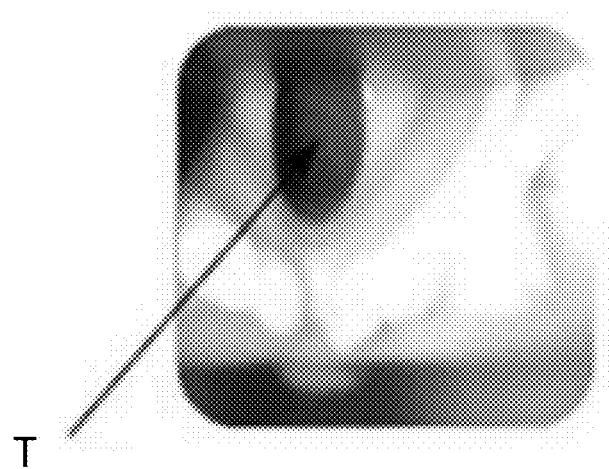
FIG. 13 is an image of the anatomical features of the body conduit as taken by a camera mounted on the medical apparatus.
Figure 14:
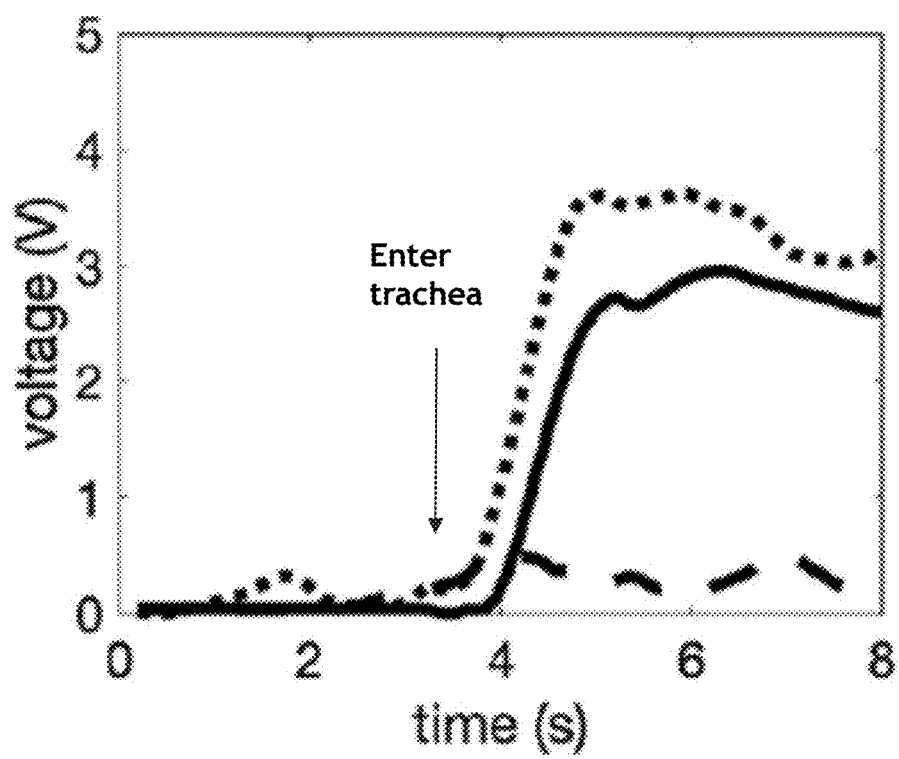
FIGS. 14-16 are time plots illustrating the forces generated by the anatomical features within the body conduit during insertion of the medical apparatus of FIG. 1
Figure 15:
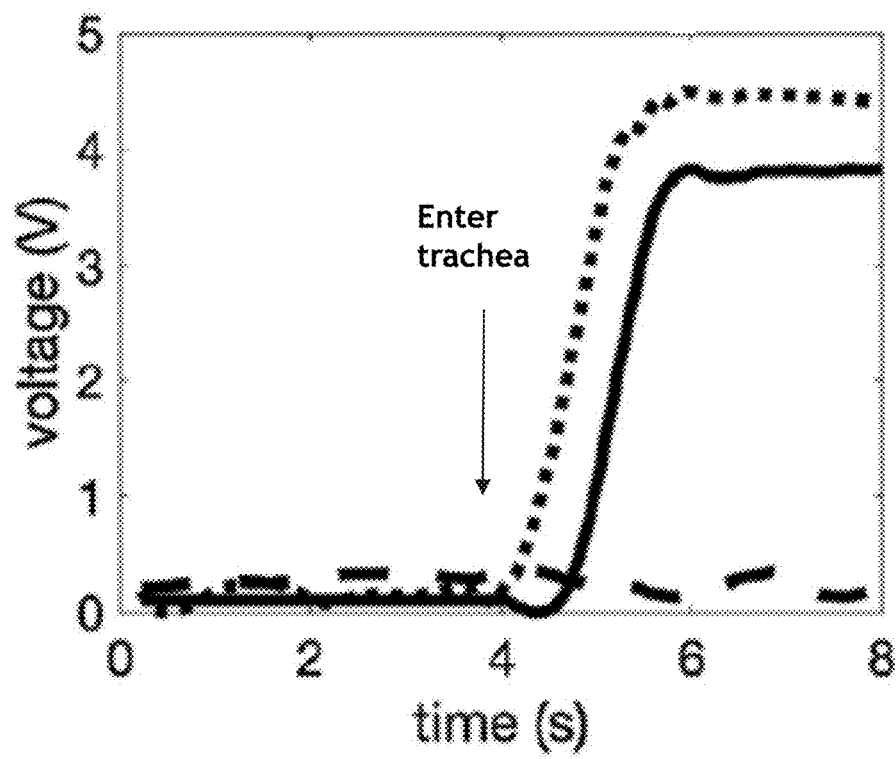
Figure 16:
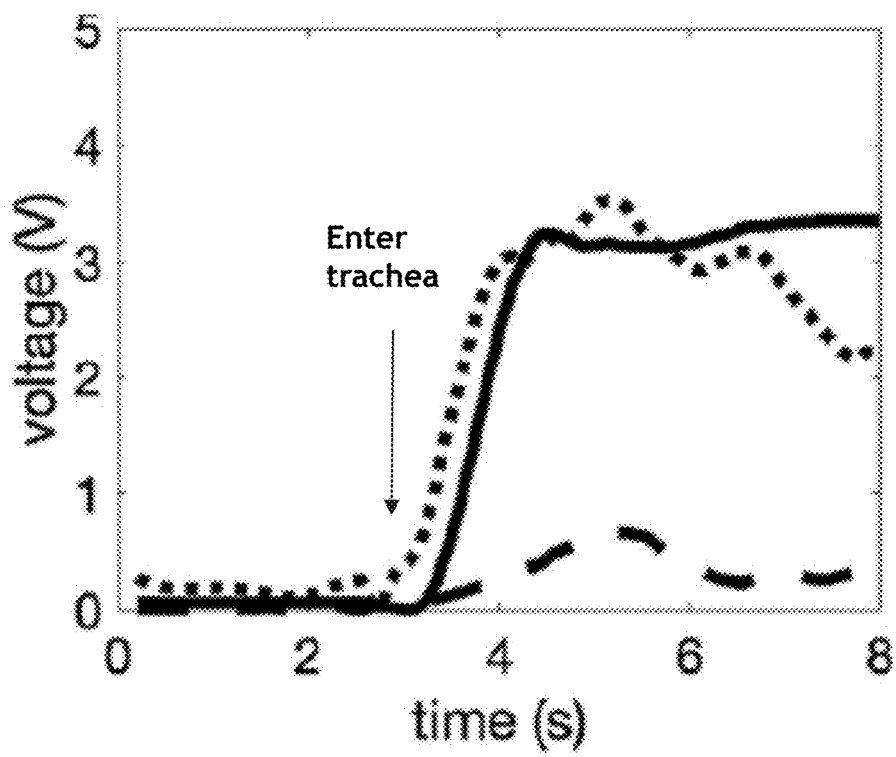

FIG. 13 is an image from a video laryngoscope indicating the location of the trachea T as seen from the camera. FIGS. 14-16 illustrate representative voltage profiles from three trials, illustrating the voltage readings of tip sensor 18a (solid line), middle sensor 18b (dashed line) and back sensor 18c (dotted) located on the blade 12, from which the features were calculated and used to train the algorithm. When the blade is incorrectly placed in the trachea, the medical apparatus accurately predicted the location. The output signal for placement in the trachea, LED 24a, was illuminated.

Figure 17:
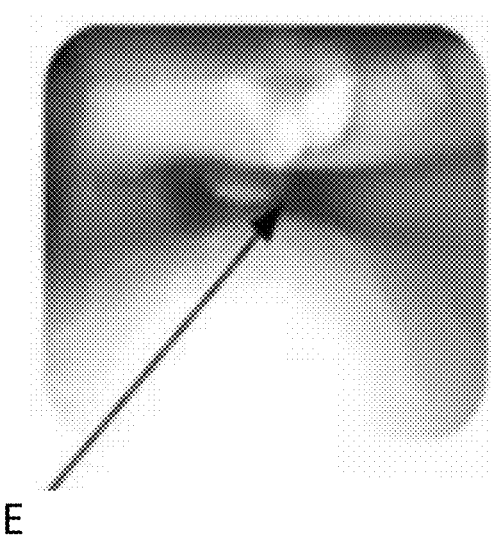
FIG. 17 is an image of the anatomical features of the body conduit as taken by a camera mounted on the medical apparatus.
Figure 18:
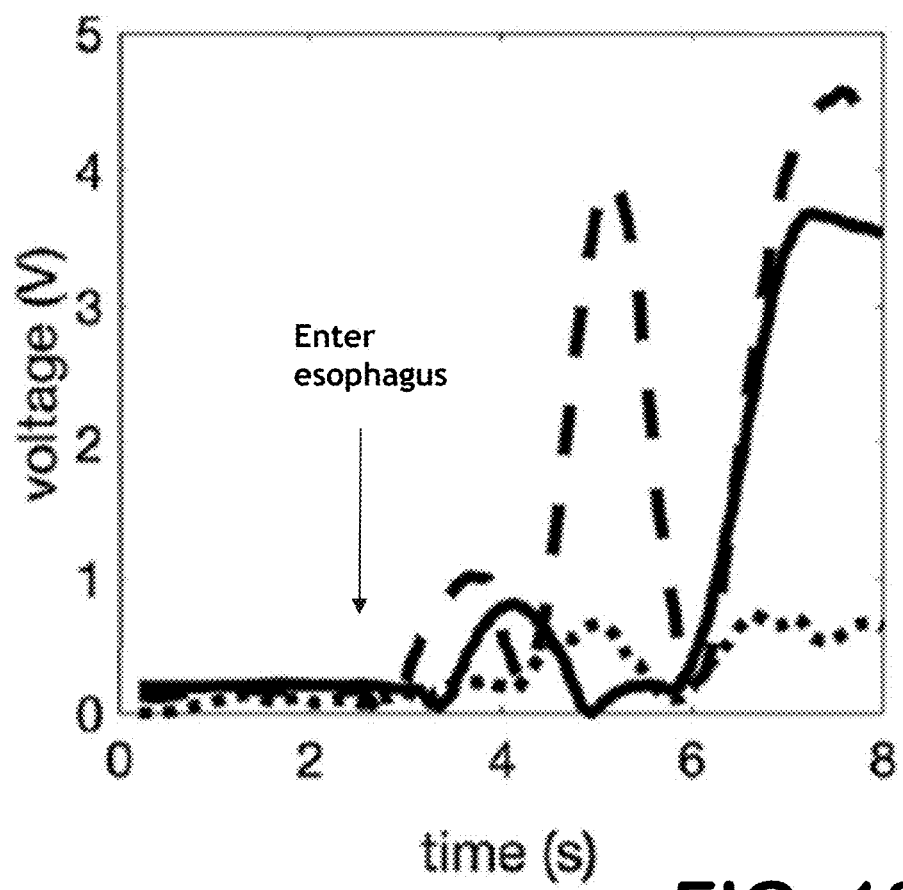
FIGS. 18-20 are time plots illustrating the forces generated by the anatomical features within the body conduit during insertion of the medical apparatus of FIG. 1
Figure 19:
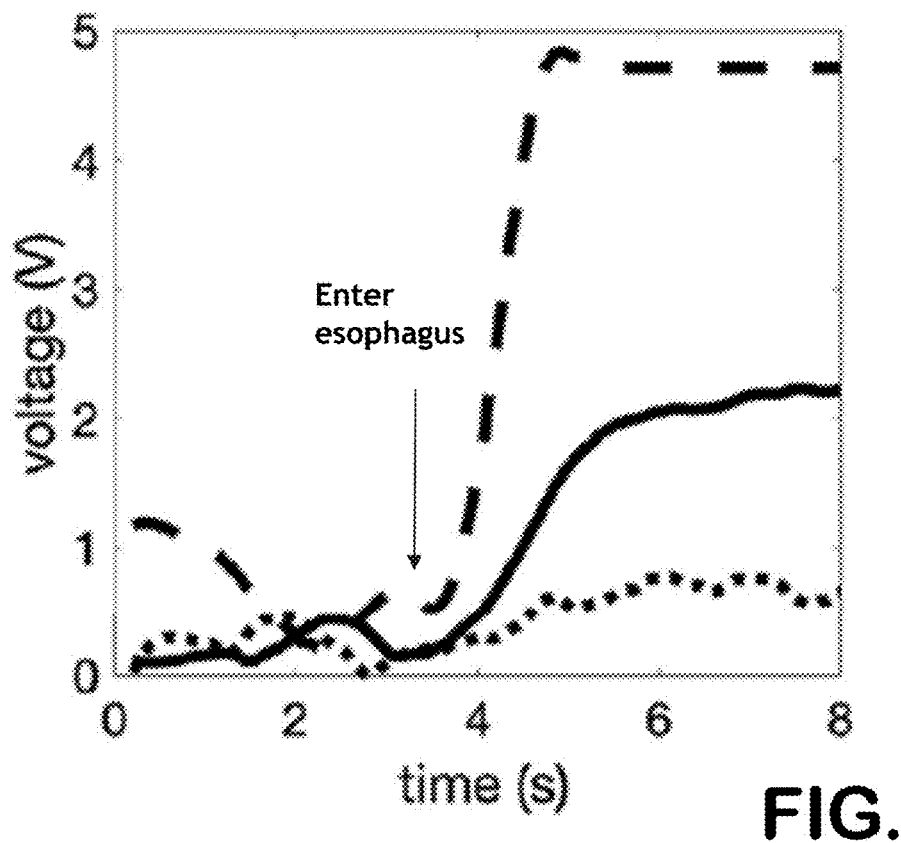
Figure 20:
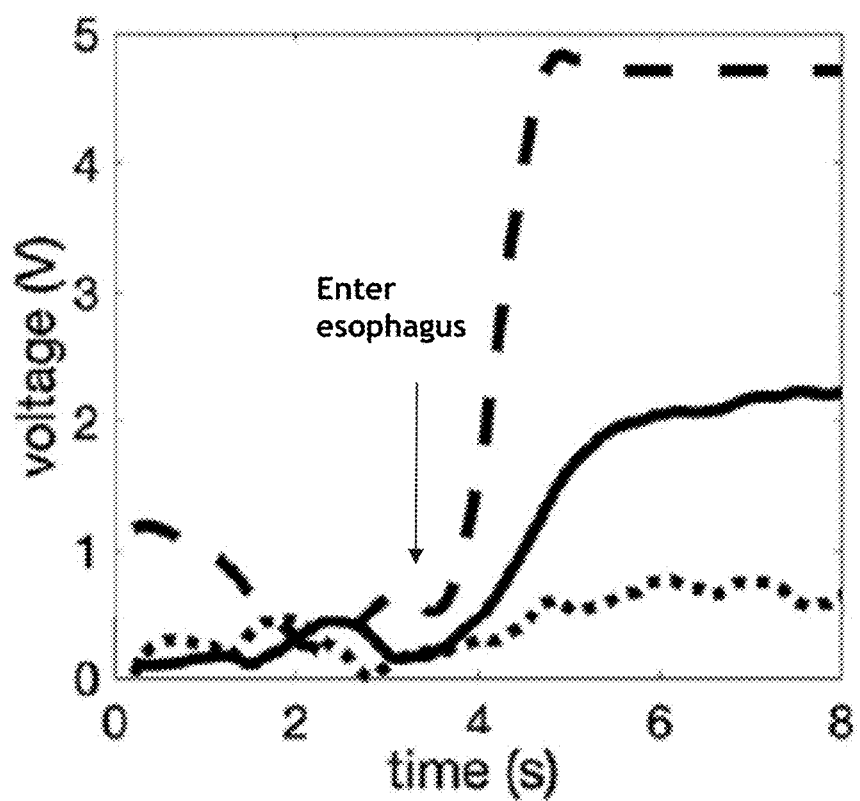

FIG. 17 is an image from a video laryngoscope indicating the location of the esophagus E as seen from the camera. FIGS. 18-20 illustrate representative voltage profiles from three trials, illustrating the voltage readings of tip sensor 18a (solid line), middle sensor 18b (dashed line) and back sensor 18c (dotted) located on the blade 12, from which the features were calculated and used to train the algorithm. When the blade is incorrectly placed in the esophagus, the medical apparatus accurately predicted the location. The output signal for placement in the esophagus, LED 24b, was illuminated.

After determining that the medical apparatus could accurately predict blade location, the apparatus was further assessed to determine how useful it was for novice intubators to achieve accuracy without expertise. As a metric, the time for novice intubators to successfully intubate with the medical apparatus was compared to the time for direct laryngoscopy, as well as the number of attempts required. (Table 1.) In Table 1, "aided novice intubation" was performed using the medical apparatus described herein. To simulate "direct novice intubation," novice intubators were asked to use a video laryngoscope blade to visualize the vocal cords and perform endotracheal tube insertion, but the intubators were not allowed to see the video screen and had to use their own intuition to determine if they saw the vocal cords and could insert the tube. The video screen was monitored to determine the number of attempts necessary to correctly intubate. A failed attempt was either incorrect insertion of the laryngoscope blade which required reinsertion, or insertion of the tube into the wrong location which required tube reinsertion even if the blade was not removed, or both. Then the intubators performed the whole procedure using the first embodiment. In both the control trial and the experimental trial, the procedures were timed and the number of attempts were recorded. The mean time (in seconds) with standard deviation was recorded for both. Moreover, the number of aided attempts it took novice intubators to successfully intubate using the medical apparatus was not significantly greater than the one attempt goal, where the number of attempts it took them to successfully intubate using direct laryngoscopy was significantly greater than one. See Table 1, above. By use of the medical apparatus, the time it takes novice intubators to successfully intubate was significantly reduced, which came significantly close to the goal of first attempt success.

Other devices on the market include the Infrared Red Intubation System (IRRIS), made by Guide In, which consists of a patch that is placed on the subject's neck and emits infrared light that is transmitted as a flashing light in the trachea. This helps video laryngoscope users distinguish between the trachea and the surrounding tissue, thereby ensuring correct tube placement. Like Guide In, The medical apparatus is designed to be compatible with the video laryngoscope. However, instead of merely indicating where the trachea is located, the medical apparatus 10 mimics expertise by providing the user with feedback regarding where the laryngoscope blade is placed. Moreover, the medical apparatus 10 prevents incorrect ETT placement before it is even inserted into the subject: it guides the user in blade placement and ensures that the tube is only placed when the vocal cords are clearly visualized and tube placement is simple.

In a second exemplary embodiment, the medical apparatus includes a disposable laryngoscope with force sensing resistors covering the blade and the handle. This would provide a complete understanding of the forces involved in intubation. For example, excessive torque on the handle is likely to result in dental damage. These force sensing resistors will collect real-time data to be output on a separate, reusable monitor equipped with a microcomputer for data processing.

Figure 21:
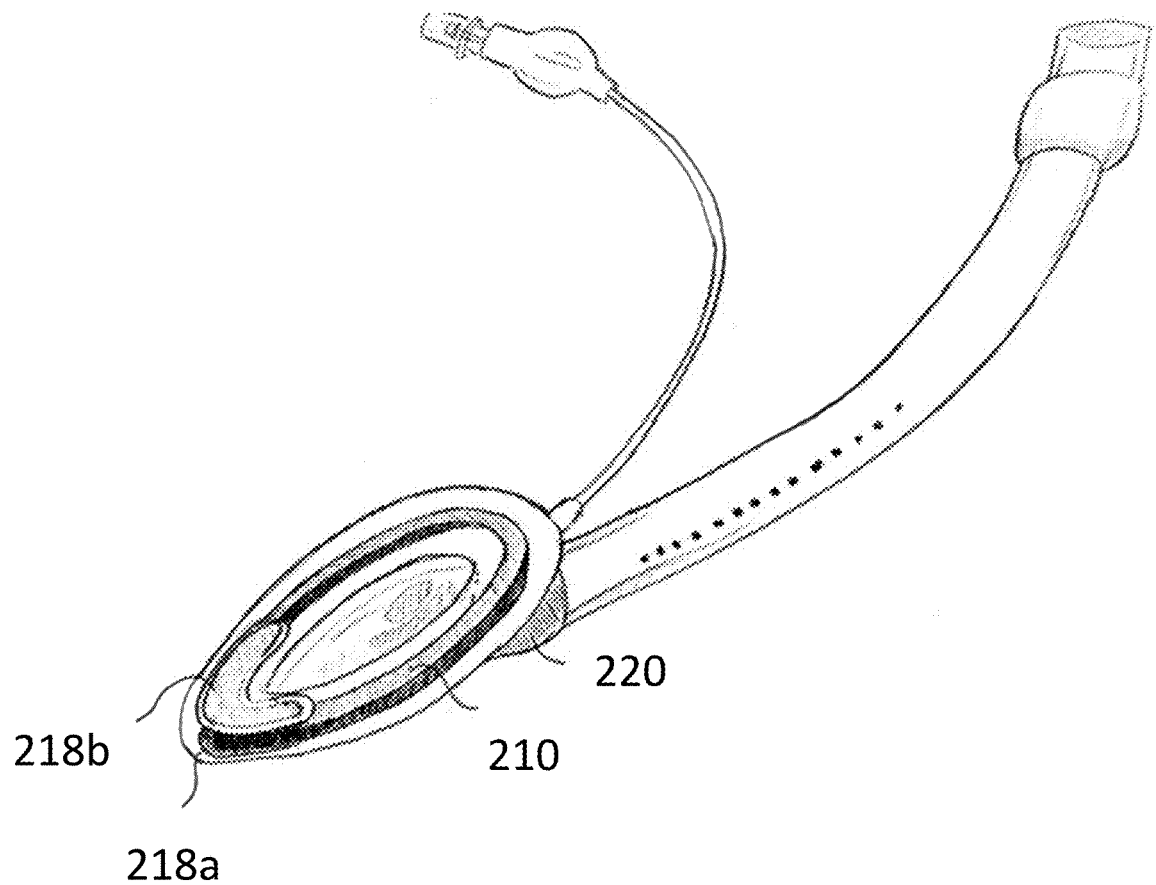
FIG. 21 illustrates a medical apparatus for insertion in a body conduit in accordance with another exemplary embodiment of the disclosed subject matter.

In a third exemplary embodiment, illustrated in FIG. 21, the medical apparatus 200 is a LMA. The medical apparatus 200 includes a ring flex sensor 210 with two axes to detect bending. One or more force sensors 218a and 218b provided for tip placement in esophagus. A gaseous pressure sensor 220 is provided for inflation confirmation and/or to prevent over inflation. Placement of Bluetooth emitter can be provided for all sensors. The sensors can be covered by waterproof/biocompatible polymer. Wires are not shown in the drawing for simplicity. The electronics to be included in sensor 220 are a power source, a PCB board, and a Bluetooth emitter to be received by a Bluetooth receiver. In some embodiments, the receiver is an anesthesia machine, a custom monitor with a microcomputer, or a smartphone.

In a fourth exemplary embodiment, the medical apparatus is an ETT. The ETT includes spatially sensitive flex sensors or a series of flex sensors along the tube. Rings of force-sensing resistors are provided along the inflatable cuff since the esophagus and trachea will have different force magnitudes (the esophagus being more pliable than the trachea). Electric components, such as the Bluetooth emitter, power source, and necessary electrical components embedded in a PCB board will be wired to the end of the device that is external to the subject's body and not inhibiting connection to the ventilator.

In a fifth exemplary embodiment, the medical apparatus is a laryngeal tube and Combitube. The apparatus is provided with sensors in substantially the same manner as the endotracheal tube, with flex sensors along the length of the tube and rings of FSRs along the cuffs. The flex sensors indicate correct tube orientation, and the rings of FSRs indicate that a seal has been formed.

In a sixth exemplary embodiment, the medical apparatus is a video laryngoscope. The apparatus is provided with sensors in substantially the same manner as the direct laryngoscope (the first embodiment), as discussed herein. Electric components, such as the Bluetooth emitter, power source, and necessary electrical components embedded in a PCB board are wired to the end of the device that is external to the subject's body and not inhibiting connection to the ventilator.

In a seventh exemplary embodiment, the medical apparatus is an endobronchial blocker having a ring of force sensing resistors on the inflatable cuff to detect whether it has slipped into the trachea. If it has slipped, it will detect a change in pressure on the cuff. Additionally, a biaxial flex sensor will be placed along the endobronchial blocker to indicate correct placement in the desired bronchus (right or left). Electric components, such as the Bluetooth emitter, power source, and necessary electrical components embedded in a PCB board will be wired to the end of the device that is external to the subject's body.

In an eighth exemplary embodiment, the medical apparatus 300 illustrated in FIG. 22. Medical apparatus 300 is substantially identical to medical apparatus 10 described herein above, with the differences noted below. Medical apparatus 300 includes a laryngoscope blade 312, a handle 314 and a monitor 320, such as a smartphone with a display screen 322. The handle 314 contains a microprocessor 316 and hardware such as Bluetooth for establishing connectivity with the smartphone 320, orientation sensor 318 and PCB 319 (FIG. 23). The microprocessor 316, orientation sensor 318 and PCB 319 are electrically connected and include a power source such as a rechargeable battery, as is known in the art. Blade 312 is secured to the distal end 314a of the handle 314. In some embodiments, a mount (not shown) is provided on the proximal end 314b of handle 314 for attachment of the smartphone 320 or other mobile device. Medical apparatus 300 includes pressure mapping sensors on the blade and handle (not shown) and an orientation sensor 318. Pressure mapping sensors in connection with software executed on the processor 316, or alternatively on the smartphone 320, can spatially resolve pressure data that the entire laryngoscope experiences to obtain nuanced physical data. The orientation sensor 318 in connection with software executed on the processor 316, or alternatively on the smartphone 320, provides data regarding positioning of the apparatus 300, such as blade 312. A graphical output of apparatus orientation 324 can be displayed on display screen 322 to provide clear directives to the intubator. Software running on the processor 316 or on the smartphone can provide a graphical indication of clinically correct placement 326 and a graphical indication of clinically incorrect placement 328. The incorporation of a smartphone would also allow for cloud connectivity (e.g. Butterfly IQ) for improved patient recordkeeping.

In various embodiments of the medical apparatus, matrixes of flex sensors will be able to detect whether the device is bent in the expected shape or not within the subject's body. Oftentimes inflatable cuffs are used with airway management devices. Equipping these with rings of force sensing resistors allow the apparatus to distinguish between the tissues (e.g., trachea and esophagus), whether a seal is formed or not, and whether the cuff has moved or not since the diameter of the airway changes.

The medical apparatus described herein are useful in a medical education setting, such as for residents in the controlled environment of the operating room. The quantified force profile will be recorded when the trainee intubator succeeds as well as when they fail. When the trainee fails and the trainer steps in, the resulting two force profiles can be readily compared to understand the tactile differences, leading to technique changes for the novice intubator. This collected data will also be collected and labeled by our research team for further data processing using machine learning algorithms.

After collecting sufficient data from these training trials—as a physician collects during training—further analysis will allow us to determine clinically relevant relationships between anatomical and haptic data involved in intubation. An independently guiding laryngoscope embodiment is useful for off-site settings (e.g. paramedics). This device mitigates the multitude of adverse events associated with traumatic and/or difficult intubations, ranging from dental damage to hypoxemia and even cardiac arrest. In some embodiments, the monitor and microcomputer are scaled down and mounted into the handle. In other embodiments, the monitor and processor will be separate, such as associated with an anesthesia machine, a computers, and smart phones. The monitor will display customized directional data to guide the medical apparatus correctly.

In some embodiments, a more robust set of sensors is provided covering both the blade and the handle. In such a way, pressure mapping is provided on a monitor to relay to intubation trainers and trainees haptic data to adjust intubation techniques.

The medical apparatus described herein can be trained on heterogeneous subject data. For example, the first embodiment was based off the Laerdal Airway Trainer in a Simulation Center.

To collect this new class of clinical data based on haptic anatomical relationships, the medical apparatus is useful as a teaching tool. This additionally fills the need for a more efficient, tactile method of teaching intubation. This embodiment can also stand as an independent device.

In some embodiments, the medical apparatus is injection molded and equipped with commercially available, custom-fit pressure sensor platforms, as well as processing and display components. ML algorithms can be used to analyze collected data during the training phase.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations can be understood and effected by those skilled in the art in practicing the claimed disclosure, from a study of the drawings, the disclosure and the appended claims.

What is claimed is:

1. A medical apparatus for insertion into an internal passage of a subject, comprising:
   a body portion defining an exterior surface;
   one or more sensors disposed on the exterior surface of the body portion, the one or more sensors providing an insertion force profile representing the force exerted by the internal passage on the sensors during insertion of the body portion; and a processor and non-volatile storage associated therewith, the processor configured to execute software to compare the insertion force profile provided by the sensors with one or more training force profiles stored on the storage, and classify the insertion force profile provided by the sensors as corresponding to at least one of the training force profiles, wherein the one or more training force profiles comprise one or more of a force profile generated by insertion of the body portion in the vallecula, a force profile generated by insertion of the body portion in the trachea, a force profile generated by insertion of the body portion in the esophagus, a force profile generated by insertion of the body portion too far or not far enough into the pharyngeal-laryngeal space, and a force profile generated by motion of the body portion in a clinically incorrect location.

2. The medical apparatus of claim 1, wherein the internal passage is the oral cavity of the subject.

3. The medical apparatus of claim 1, wherein the processor is configured to compare the insertion force profile provided by the one or more sensors over a three second period.

4. The medical apparatus of claim 1, wherein medical apparatus is a laryngoscope, a laryngeal mask airway (LMA), an endotracheal tube (ETT), a combitube, a laryngeal tube, a video laryngoscope, or an endobronchial blocker.

5. The medical apparatus of claim 1, wherein the processor is further configured to display the insertion force profile.

6. The medical apparatus of claim 1, wherein the body portion comprises a blade portion defining an exterior surface thereof, and wherein the one or more sensors are disposed on the exterior surface of the blade portion.

7. The medical apparatus of claim 1, wherein the body portion further comprises a handle defining an exterior surface thereof, and wherein the one or more sensors are disposed on the exterior surface of the handle.

8. The medical apparatus of claim 1, wherein the body portion further comprises a hand-held, pliable airway tube defining an exterior surface thereof, and wherein the one or more sensors are disposed on the exterior surface of the tube.

9. The medical apparatus of claim 1, wherein the medical apparatus is disposable.

10. The medical apparatus of claim 1, wherein the sensors are force sensing resistors.

11. The medical apparatus of claim 1, wherein the sensors are one or more of flex sensors, strain gauges, gyroscopes, accelerometers, proximity sensors, light sensors, and temperature sensors.

12. The medical apparatus of claim 1, wherein the one or more training force profiles correspond to force exerted by the internal passage against the sensors as a function of time.

13. A medical apparatus for insertion into an internal passage of a subject, comprising:

a body portion defining an exterior surface;

one or more sensors disposed on the exterior surface of the body portion, the one or more sensors providing an insertion force profile representing the force exerted by the internal passage on the sensors during insertion of the body portion; and a processor and non-volatile storage associated therewith, the processor configured to execute software to compare the insertion force profile provided by the sensors with more or more training force profiles stored on the storage, the training force profiles corresponding to forces exerted on a sensor during insertion during a clinically correct insertion and a clinically incorrect insertion, and classify the insertion force profile provided by the sensors as a clinically correct insertion or a clinically incorrect insertion, wherein the clinically correct training force profile comprises a force profile generated by insertion of the body portion in the vallecula, and wherein the clinically incorrect force profile comprises a force profile generated by insertion of the body portion in the trachea or the esophagus.

14. The medical apparatus of claim 13, wherein the internal passage is the oral cavity of the subject.

15. The medical apparatus of claim 13, wherein the processor is configured to compare the insertion force profile provided by the one or more sensors over a three second period.

16. The medical apparatus of claim 13, wherein medical apparatus is a laryngoscope, a laryngeal mask airway (LMA), an endotracheal tube, a combitube, laryngeal tube, a video laryngoscope, or an endobronchial blocker.

17. The medical apparatus of claim 13, wherein the processor is further configured to execute software to display data between two or more sequential insertions of the body portion and to highlight differences between pressure profiles.

18. The medical apparatus of claim 13, further comprises an indicator to convey to a user that the insertion profile corresponds to a clinically incorrect or clinically correct insertion profile.

19. The medical apparatus of claim 18, wherein the indicator is at least one of visual, audible or haptic.

20. The medical apparatus of claim 13, wherein the body portion comprises a blade portion defining an exterior surface thereof, and wherein the one or more sensors are disposed on the exterior surface of the blade portion.

21. The medical apparatus of claim 13, wherein the body portion further comprises a handle defining an exterior surface thereof, and wherein the one or more sensors are disposed on the exterior surface of the handle.

22. The medical apparatus of claim 13, wherein the body portion further comprises a hand-held, pliable airway tube defining an exterior surface thereof, and wherein the one or more sensors are disposed on the exterior surface of the tube.

23. The medical apparatus of claim 13, wherein the medical apparatus is disposable.

24. The medical apparatus of claim 13, wherein the sensors are force sensing resistors.

25. The medical apparatus of claim 13, wherein the sensors are one or more of flex sensors, strain gauges, gyroscopes, accelerometers, proximity sensors, light sensors, and temperature sensors.

26. The medical apparatus of claim 13, wherein the force profiles correspond to force exerted by the internal passage against the sensors as a function of time.

27. A medical apparatus for insertion into an internal passage of a subject, comprising:

a body portion defining an exterior surface;

one or more sensors disposed on the exterior surface of the body portion, the one or more sensors providing an insertion force profile representing the force exerted by the internal passage on the sensors during insertion of the body portion; and a processor and non-volatile storage associated therewith, the processor configured to execute software to compare the insertion force profile provided by the sensors with more or more training force profiles stored on the storage, the training force profiles corresponding to forces exerted on a sensor during insertion during a clinically correct insertion and a clinically incorrect insertion, and classify the insertion force profile provided by the sensors as a clinically correct insertion or a clinically incorrect insertion, wherein the one or more training force profiles correspond to force exerted by the internal passage against the sensors as a function of location.

28. A method of insertion of a medical apparatus into an internal passage of a subject, comprising:
    providing a body portion defining an exterior surface and one or more sensors disposed on the exterior surface of the body portion;
    inserting the body portion into the internal passage of the subject;
    providing an insertion force profile by the one or more sensors, the force profile representing the force exerted by the internal passage on the sensors during insertion of the body portion; and
    providing a processor and non-volatile storage associated therewith, the processor configured to execute software comparing the insertion force profile provided by the sensors with two or more training force profiles stored on the storage; and
    classifying the insertion force profile provided by the sensors as corresponding to at least one of the training force profiles,
    wherein the two or more training force profiles comprise one or more of a force profile generated by insertion of the body portion in the vallecula, a force profile generated by insertion of the body portion in the trachea, a force profile generated by insertion of the body portion in the esophagus, a force profile generated by insertion of the body portion too far or not far enough into the pharyngeal-laryngeal space, and a force profile generated by motion of the body portion in a clinically incorrect location.

29. The method of claim 28, wherein the two or more training force profiles correspond to forces exerted on a sensor during insertion during a clinically correct insertion and a clinically incorrect insertion, and classifying the insertion force profile comprises classifying the insertion force profile provided by the sensors as a clinically correct insertion or a clinically incorrect insertion.

30. The method of claim 29, further comprising providing notification to a user that the insertion force profile corresponds to a clinically correct insertion or an clinically incorrect insertion.

31. A medical apparatus for insertion into an internal passage of a subject, comprising:
    a body portion defining an exterior surface;
    one or more sensors disposed on the exterior surface of the body portion, the one or more sensors providing an insertion force profile representing the force exerted by the internal passage on the sensors during insertion of the body portion; and
    a processor and non-volatile storage associated therewith, the processor configured to execute software to
    compare, during insertion, the insertion force profile provided by the sensors with two or more training force profiles stored on the storage, the training force profiles corresponding to forces exerted on a sensor during insertion during a clinically correct insertion and a clinically incorrect insertion, and
    classify, during insertion, the insertion force profile provided by the sensors as a clinically correct insertion or a clinically incorrect insertion,
    wherein the clinically correct training force profile comprises a force profile generated by insertion of the body portion in the vallecula, and wherein the clinically incorrect force profile comprises a force profile generated by insertion of the body portion in the trachea or the esophagus.

32. The medical apparatus of claim 31, further comprises an indicator to convey to a user, during insertion, that the insertion profile corresponds to a clinically incorrect or clinically correct insertion profile.

33. A method of insertion of a medical apparatus into an internal passage of a subject, comprising:
    providing a body portion defining an exterior surface and one or more sensors disposed on the exterior surface of the body portion;
    inserting the body portion into the internal passage of the subject;
    providing an insertion force profile by the one or more sensors, the force profile representing the force exerted by the internal passage on the sensors during insertion of the body portion; and
    providing a processor and non-volatile storage associated therewith, the processor configured to execute software comparing the insertion force profile provided by the sensors during insertion with two or more training force profiles stored on the storage, and classify the insertion force profile provided by the sensors as corresponding to at least one of the training force profiles; and
    classifying, during insertion, the insertion force profile provided by the sensors as corresponding to at least one of the training force profiles,
    wherein the two or more training force profiles comprise one or more of a force profile generated by insertion of the body portion in the vallecula, a force profile generated by insertion of the body portion in the trachea, a force profile generated by insertion of the body portion in the esophagus, a force profile generated by insertion of the body portion too far or not far enough into the pharyngeal-laryngeal space, and a force profile generated by motion of the body portion in a clinically incorrect location.

* * * * *